United States Patent [19]

Christ

[11] 4,209,405

[45] Jun. 24, 1980

[54] CENTRIFUGE

[75] Inventor: Alfred Christ, Zurich, Switzerland

[73] Assignee: Escher Wyss Limited, Zurich, Switzerland

[21] Appl. No.: 956,422

[22] Filed: Oct. 31, 1978

[30] Foreign Application Priority Data

Dec. 7, 1977 [CH] Switzerland ..................... 014980/77

[51] Int. Cl.[2] ............................................. B01D 33/10

[52] U.S. Cl. .................................................. 210/376

[58] Field of Search ................. 55/339, 205, 340, 466; 34/58, 59; 210/374, 360 R, 369, 376, 372

[56] References Cited

U.S. PATENT DOCUMENTS 3,365,066 1/1968 Howell ................................ 210/374

FOREIGN PATENT DOCUMENTS 926565 5/1963 United Kingdom .

1052434 12/1966 United Kingdom .

*Primary Examiner*—Frank Sever

*Attorney, Agent, or Firm*—Robert A. Ostmann

[57] ABSTRACT

Centrifuge having a centrifuge housing containing a gaseous medium being separated from the environment of the centrifuge, and an outlet pipe for the flow of solids; the improvement that this outlet pipe for the stream of solids comprises a diffusor and that the end of the diffusor is connected to the solids chamber of the centrifuge by means of a return channel.

5 Claims, 5 Drawing Figures

1
2
3
4
5
6
7
II
II 4
8
9
10
11
12
6
III
III 8
9

4
8
11
13
6
V
V 13
8

CENTRIFUGE

BACKGROUND OF THE INVENTION

The invention relates to a centrifuge having a centrifuge drum, a centrifuge housing, a solids chamber adjacent to the centrifuge drum and containing a gaseous medium, the said chamber being separated from the environment of the centrifuge by the walls of the centrifuge housing, and having an outlet pipe for a flow of solids from the solids chamber.

A pusher centrifuge is known from British Pat. No. 926,565 wherein the solids leaving the centrifuge drum are caught in an annular channel surrounding the end of the centrifuge drum. The solids flowing along the wall of the channel leave this channel as a directed stream of solids through an opening in the base of the channel. This stream of solids reaches a conveyor belt or a pipe or else flows directly into a storage chamber. In all these embodiments, the solids chamber of the centrifuge communicates with the environment of the centrifuge.

However, if the nature of the material to be centrifuged is such that it is essential to keep the solids chamber of the centrifuge separate from the environment of the centrifuge, the solids have to be removed from the solids chamber through an outlet pipe passing in leak-tight manner through the wall of the centrifuge housing.

SUMMARY OF THE INVENTION

The invention is based on the realization that the stream of solids leaving the sealed solids chamber through the outlet pipe will also carry some of the gaseous medium in the solids chamber out with it. As a result, the pressure in the solids chamber falls and liquid is sucked into the solids chamber from the liquids chamber of the centrifuge, unless complex sealing devices have been provided.

The invention sets out to provide a centrifuge wherein the quantity of gaseous medium in the solids chamber is reduced as little as possible by the discharging of the solids, thus preventing the harmful pressure difference and ensuring that the state of the gaseous medium in the solids chamber is maintained.

According to the invention, this is achieved in a centrifuge as described at the beginning in that the outlet pipe for the stream of solids comprises a diffusor and that the end of the diffusor is connected to the solids chamber of the centrifuge by means of a return channel.

The stream of gaseous medium escaping expands in the diffusor, and its pressure rises. Thus, the majority of the gaseous medium can flow back into the solids chamber through the return channel.

Preferably, the diffusor widens in stages.

Advantageously, the diffusor may be followed by a second diffusor or by a plurality of additional diffusors. The end of a diffusor is connected to the solids chamber of the centrifuge by means of a return channel.

It may be advantageous to construct the recess of the step of the diffusor as a return channel.

Advantageously, the path for the stream of solids is formed by a continuous portion of the wall of the diffusor.

BRIEF DESCRIPTION OF THE DRAWING

The invention will now be described in more detail with reference to the drawings which show embodiments by way of example of the invention in a simplified form. In the drawings.

DESCRIPTION OF THE PREFERRED EMBODIMENT

Figures 1, 2, 3, 4, 5:
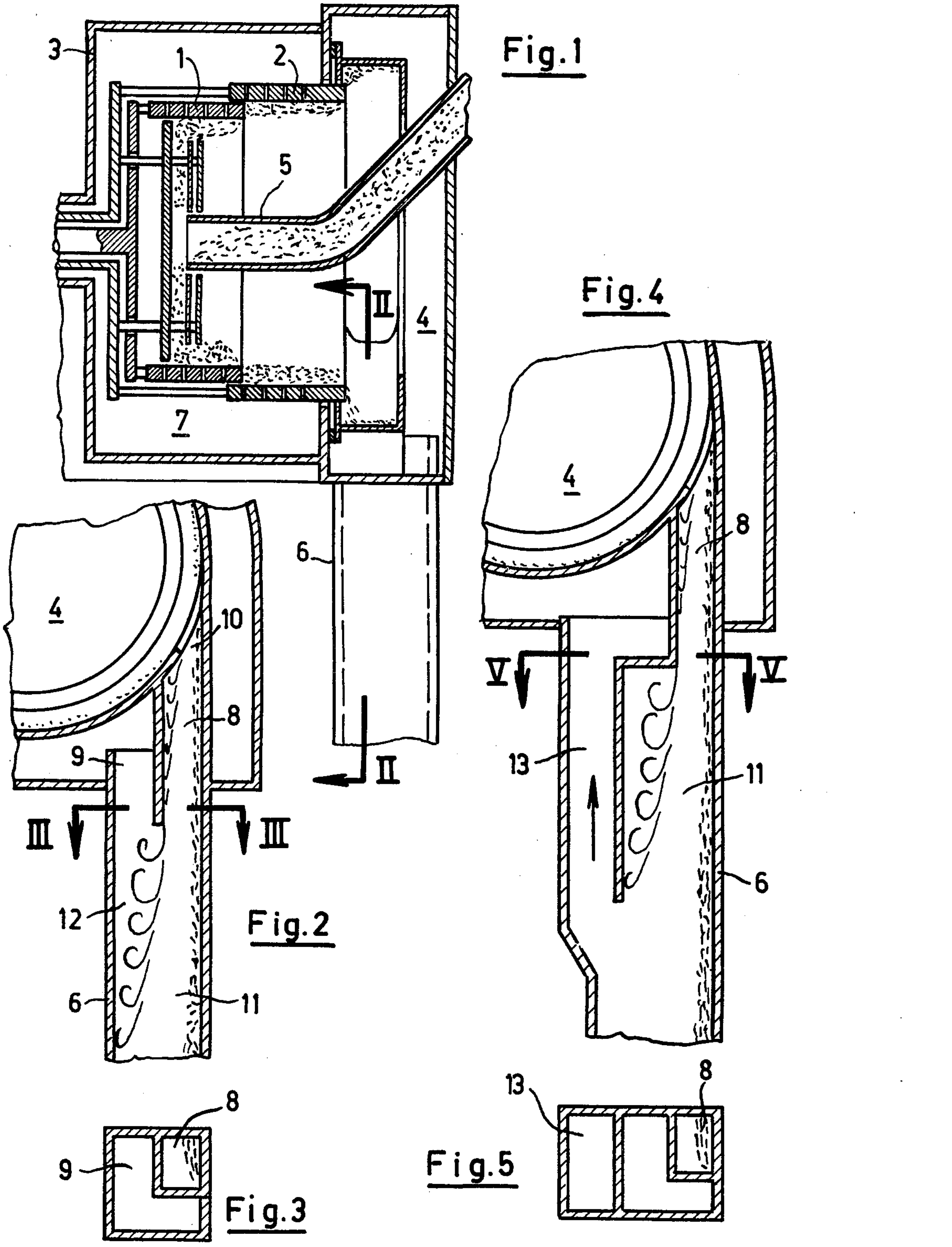
FIG. 1 is a vertial axial section through a pusher centrifuge.
FIG. 2 is a section on the line II—II in FIG. 1.
FIG. 3 is a section on the line III—III in FIG. 2.
FIG. 4 is a section corresponding to FIG. 2 through another pusher centrifuge.
FIG. 5 is a section on the V—V in FIG. 4.

The pusher centrifuge shown in FIGS. 1 to 3 has a centrifuge drum consisting of two parts 1 and 2, a centrifuge housing 3, a solids chamber 4 adjoining the centrifuge drum 1, 2 and containing a gaseous medium, an inlet pipe 5 for the material to be centrifuged, an outlet pipe 6 for the solids and a liquids chamber 7 for the liquid removed by centrifuging. The solids chamber 4 is separated from the environment of the centrifuge by the walls of the centrifuge housing 3, whilst the outlet pipe 6 leads out of the solids chamber 3.

The outlet pipe 6 for the stream of solids comprises a diffusor 8 and the end of the diffusor 8 is connected to the solids chamber 4 by means of a return channel 9.

The diffusor 8 widens out in steps, i.e. the cross section of the inlet 10 very rapidly widens out to a cross section twice the size which remains constant over practically the entire length of the diffusor 8. The length of the part with the larger cross section is more than twice the diameter of the larger cross section (if the cross section is not circular, the so called "hydraulic diameter" is taken as the diameter).

The diffusor 8 is followed by a second diffusor 11. The end of the first diffusor 8 forms the inlet to the second diffusor 11. The diffusor 11 is also constructed as a stepped diffusor, and the cross section remains constant over a length which is more than twice the diameter of the larger cross section.

The flow of gaseous medium in the diffusor 11 gradually widens out, from the inlet of the diffusor to its end, to the full width of the diffusor. Starting from the edge of the stream, turbulence forms in the recess 12 of the step in the diffusor 11. The recess 12 is also constructed as a return channel which opens into the return channel 9 of the diffusor 8.

In the embodiment by way of example shown in FIGS. 4 and 5, the successive diffusors 8 and 11 form a two-step diffusor, the end of which is connected to the solids chamber 4 by means of a return channel 13.

FIG. 4 shows that the flow in the diffusors 8 and 11 widens out continuously, i.e. they could comprise a continuous solid wall extending along the separating line indicated between the flow of gaseous medium and the turbulence chamber.

I claim:

1. Centrifuge having a centrifuge drum, a centrifuge housing, in said housing a solids chamber adjacent to the centrifuge drum and containing a gaseous medium the said chamber being separated from the environment of the centrifuge by the walls of the centrifuge housing, and having an outlet pipe for a flow of solids from the solids chamber; the improvement that the outlet pipe for the flow of solids comprises a diffusor and that a return channel connects the end of the diffusor to the solids chamber of the centrifuge.

2. Centrifuge according to claim 1, in which the diffusor widens out in a step or steps.

3. Centrifuge according to claim 1, in which a second diffusor or a plurality of additional diffusors follow said diffusor, and the end of at least one diffusor is connected to the solids chamber of the centrifuge.

4. Centrifuge according to claim 2, in which the recess of the step is constructed as the return channel.

5. Centrifuge according to claim 1, in which a continuous portion of the wall of the diffusor forms the path for the flow of solids.

* * * * *